March 24, 1942.     O. C. BOTZ     2,277,382
APPARATUS FOR QUICK FREEZING FOOD PRODUCTS
Filed Dec. 1, 1937     2 Sheets-Sheet 1

Inventor
OTTO C. BOTZ
By Raymond J. Norton
Attorney

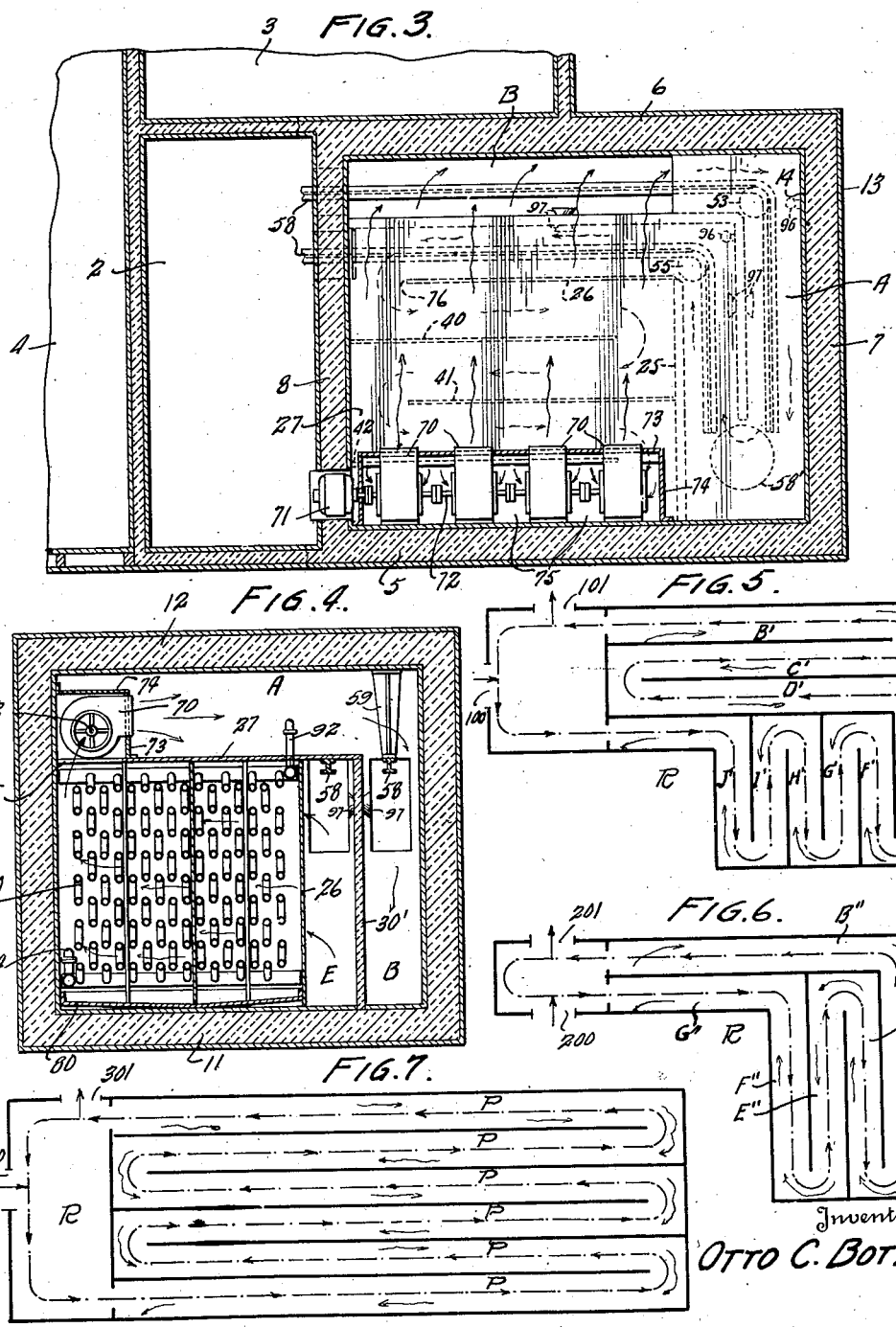

Patented Mar. 24, 1942

2,277,382

UNITED STATES PATENT OFFICE 2,277,382

APPARATUS FOR QUICK FREEZING FOOD PRODUCTS

Otto C. Botz, Jefferson City, Mo.

Application December 1, 1937, Serial No. 177,565

4 Claims. (Cl. 62—102)

This invention relates to refrigeration, more particularly to an improved method of and apparatus for quick freezing food products.

In recent years there has been a marked increase in the use of refrigeration for preserving fresh, perishable foods. A notable example is the expanding use of quick freezing processes for preserving different varieties of fresh vegetables, meats, and the like. The potential use of such methods, however, is restricted seriously because of the large space requirements and the relatively low efficiency of the units suggested heretofore. In typical earlier systems, the method employed involved the utilization of separate pre-chilling and freezing stages with a commensurately large over-all plant size, as well as manipulative complications in maintaining differential thermal conditions in such stages.

The utilization of the quick freezing principle could be extended very considerably if there was available for potential users a simple, compact, self-contained apparatus, and particularly one in which the refrigeration effect could be adjusted within rather wide limits so as to permit employment for different types of products.

As a result of considerable experimentation, I have devised a novel method of sharp freezing, operating upon a continuous counterflow principle and in which the path of travel of the products to be treated is correlated in a novel manner with the refrigeration apparatus and with the flow of refrigerated air, so as to insure an optimum refrigeration effect in a minimum size of apparatus.

In order to enable a more ready comprehension of the invention, preferred physical embodiments of the underlying principles are illustrated in the apparatus shown in the accompanying drawings, in which:

Figure 3 is a horizontal section through the structure taken on line 3—3 of Figure 2.

Figure 4 is a cross section taken on line 4—4 of Figure 1.

Figure 5 is a diagrammatic illustration showing the path of flow of the products to be treated, with respect to the flow of the cooling medium.

Figures 6 and 7 are views similar to Figure 5, showing modifications of the paths of the products and cooling medium respectively.

In order more clearly to explain the invention, an apparatus which has been designed especially for the refrigeration of fully drawn, fresh chickens will be described. It will be appreciated that in such a system the major problems of quick freezing of food products are present to an accentuated degree. For example, in the quick freezing of such poultry, care must be exercised to insure the effective abstraction of the body heat of the product prior to the reduction of its temperature to the low order required in quick freezing. Hence, while the apparatus shown is designed primarily for the sharp freezing of chickens, it will be understood that the principles involved in its construction are similarly available and may be utilized for treating other food products, such as meats, fish, vegetables, and fruits, either whole or in cuts. In utilizing the unit for such other products, the size of the unit, speed of travel through the cooling medium, and the temperature of the cooling medium may be varied to conform to the special requirements of such products.

As will be seen more fully, the present method involves the passage of the products to be treated through a series of narrow, elongated, respectively adjacent, sinuous passageways and while in contact with a stream of positively circulating, cold air, which latter flows countercurrent to the products. The unit is so designed that prior to discharge, the products are contacted with air at the minimum temperature and such air, in its counterflow continuously abstracts heat from the product to be frozen. Such products enter the unit, preferably at a point closely adjacent the point of discharge, and are thus contacted with the warmer air, which latter then passes in heat exchange relationship to a refrigerating medium and is recycled through the system. It is particularly to be observed that the flow of air in heat exchange relationship to the refrigerating unit is preferably substantially normal to the flow of air through the passageway, in which freezing of the product is effected. It will also be observed that the air which is utilized to contact with and abstract heat from the products is extenuated in a relatively narrow stream. In these circumstances, maximum heat transfer as between the air and the refrigerant, on the one hand, and the air and the products to be frozen, on the other, is achieved. It will also be observed that further thermal economies are attained by utilizing the concept of the relatively long, narrow and respectively adjacent passageways. In these circumstances, the differential in temperature on the opposite sides of the partitions is maintained at a low value and heat transmission therethrough is commensurately diminished. These and other advantages will be more readily appreciated from a consideration of a preferred type of unit.

Figure 1:
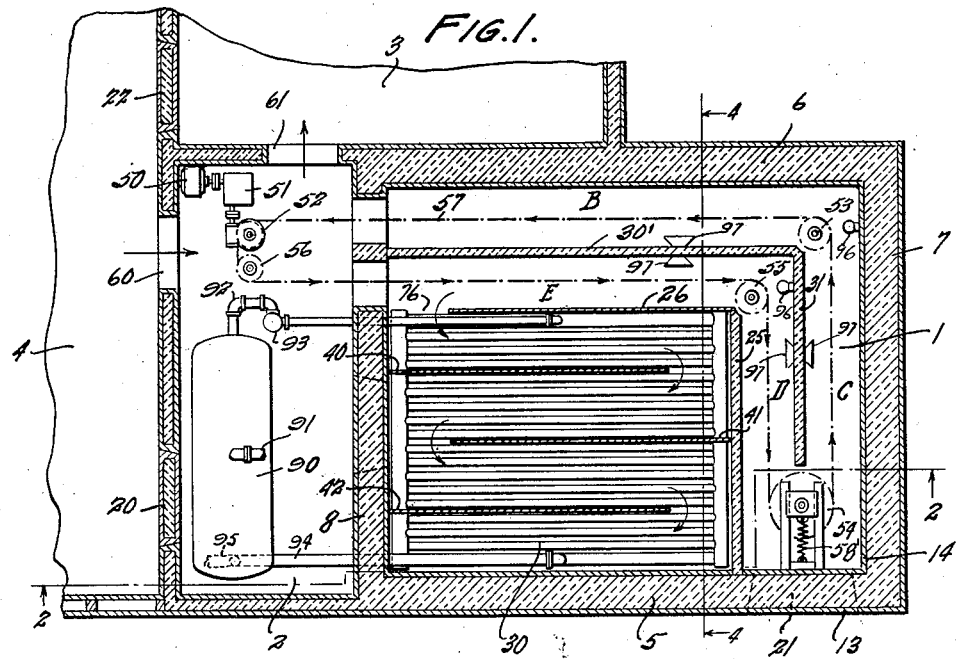
Figure 1 is a top sectional view showing the essential elements of the system.

As shown in the drawings, the apparatus includes a main chamber 1 in which the actual freezing is effected; an antechamber 2, serving to house certain of the refrigerating apparatus and mechanical driving mechanism, and a receiving or storage room 3, in which the frozen articles may be processed, packed, or otherwise treated. As shown in Figures 1 and 3, the above described chambers may be associated with other structures such for example as the receiving room 4, of an existing building, or the like. Since the essential function of sharp freezing is accomplished by the mechanism housed in chambers 1 and 2, it will be appreciated that these two chambers may be, and preferably are constructed as a separate entity, adapted for employment alone or adapted to be associated with existing structures, as for example, with an existing building provided with an ammonia refrigerating machine. Since the unit is reduced to an eminently compact structure, it may be employed as by being mounted on a truck or trailer to serve as a mobile unit. In these circumstances, as will be appreciated, some of the power required in the operation, as for example, that necessary to drive the conveyor and/or the blower, may be taken off from the automotive power plant of the vehicle. When the unit is utilized with a mobile vehicle, such as a truck or train, it will be understood that it may be operated while the vehicle is in transit and/or while the vehicle is temporarily located at some particular point.

The unit is constructed of suitable materials in a manner well known to those skilled in the art. Thus the unit may comprise the side walls 5 and 6, end walls 7 and 8, and the bottom and top walls 11 and 12, respectively. As shown the outer walls consist of sheathing 13 of suitable weather resistant material, such as metal, protectively coated wood, and the like. The inner walls 14 are spaced some considerable distance from the outer walls and the space therebetween is filled with material of high insulating value, such as cork board and the like. This construction is to insure the maximum insulation and for this purpose, the cork insulation filling may be of the order of 12 inches thick, more or less. The interior walls 14 are composed of any suitable moisture-resistant material, such as metal, Bakelite impregnated or coated boards, and the like; in short, any suitable material which is sufficiently moisture-resistant so as to preclude the possibility of moisture pick-up in the insulation material.

The anteroom 2, as shown, may be provided with a door 20, so as to provide access to the accumulator tank, conveyor mechanism, or other units housed there. The side wall 5, if desired, may be provided with the door 21 so as to provide access to the conveyor for the purpose of inspection, repair, and the like.

The receiving or storage room 3, as shown, is similarly provided with the door 22. As will be noted from an inspection of Figures 1 and 3, the main unit, comprising the chambers 1 and 2, are thoroughly insulated so that heat losses are reduced to the minimum.

The freezing chamber itself comprises in effect two sections. One such section is the centrally located refrigerator per se. This is shown as comprising the bunker or bank of expansion coils 30. Such expansion coils are housed within the interior chamber comprised of the end wall 25, the side wall 26, and the top wall 27. The end wall 25 is a substantially solid wall, whereas the side wall 26 and top wall 27 are provided with apertures, more fully to be described, so as to provide for the recirculation of air to and from this interior chamber.

As will be observed, particularly in Figure 3, the bunker chamber is positioned substantially centrally with respect to the remainder of the chamber 1. Such remainder comprises, as shown, a series of narrow, elongated, angular passageways. As will be seen, with particular reference to Figure 1, such chamber is divided into two L-shaped and respectively adjacent passageways by means of the angular partitions 30' and 31.

Figure 2:
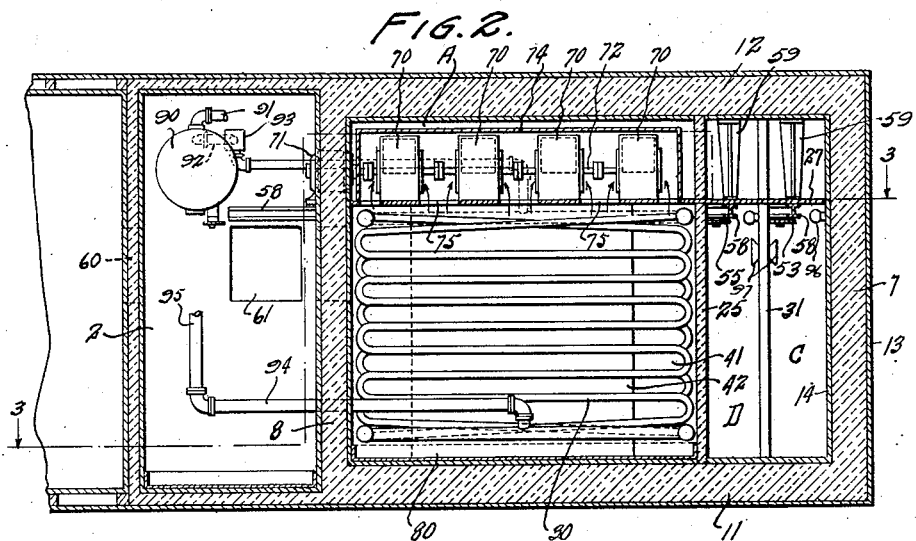
Figure 2 is a vertical section taken on line 2—2 of Figure 1.

The partition 31 (see Figures 1 and 2) extends vertically from the bottom to the top of chamber 1, whereas the partition 30' extends vertically from the bottom of the chamber to the extension of top wall 27 (see Figure 4). As shown, particularly in Figure 1, the partition 30' extends horizontally from the side wall 8 to the partition 31, while the latter terminates some distance short of the side wall 13. In these circumstances, the cooling chamber is divided into a series of communicating passageways. The first section, A, of such passageway is a plenum chamber, confined by the top wall 11 of the unit and the top wall 27 of the bunker chamber. As will be observed from an inspection of Figure 4, this plenum chamber is in open communication with the vertically narrowed, horizontally elongated passageway B, defined by a side wall 6 of the unit and the partition 30'. Such passageway section B is continued as an angular extension or passageway section C, the latter being established between the end wall 7 and the partition 31. Such latter passageway section in turn communicates with the respectively adjacent passageway section D, this latter being defined by the end wall 25 of the bunker chamber and the partition 31. The section D is continued as an angularly disposed passageway section E, defined by the partition 30' and the side wall 26, and the bunker unit.

As shown particularly in Figure 1, the side wall 26 is shortened adjacent the wall 8 or is provided with apertures, louvres or other openings, so as to establish fluid communication between the passageway section E and the interior of the bunker chamber. In the preferred form of construction, the expansion coils 30 are associated with a series of baffles 40, 41 and 42, so as to define, in effect, a sinuous course for air flow over the expansion coils.

As has been explained hereinbefore, a salient feature of the present invention is the fact that the products or materials to be frozen are passed in heat exchange counterflow relationship with the cold air. For this purpose, any suitable type of conveyor mechanism, the speed of which may readily be controlled, may be employed. A diagrammatic illustration of such unit is shown more particularly in Figure 1. As there shown, the conveyor may be driven by any suitable source of power, such as the motor 50. Such motor connects through a gear reduction unit 51 with the driving pulley 52 of the conveyor. Associated with the driving gear 52 are a series of idler pulleys 53, 54, 55 and 56. A suitable conveyor belt, chain, or the like, indicated diagrammatically at 57, passes over the driving pulley 52 and the several idler pulleys. The pulley 54, as shown, is preferably enlarged in size and is provided with means, such as the spring 58, whereby any predetermined resilient tension may be established on the conveyor system. The conveyor system may include a series of tracks 58, supported by hangers 59, on which individual rack units may move through the passageways.

In accordance with the principles expressed herein, the products to be frozen are transported by the conveyor system from one point through the series of angularly disposed, communicated passageways and are discharged from such passageways under the optimum temperature conditions at a point adjacent the point of entry. For this purpose, the wall 20 is provided with a small opening or feeding door 60, through which an operator may insert the products to be treated so as to be mounted on the conveyor system. Similarly, the storage chamber 3 communicates with the main freezing chamber through the medium of the small passageway 61. By reason of this opening, an operator may remove frozen products from the conveyor belt or system for packaging or storage in the storage chamber 3.

As has been indicated hereinbefore, provision is made for positively circulating air over the expansion coil 30 and through the several connecting passageways. As shown particularly in Figures 3 and 4, such circulation is effected by means of a series of blowers or fans 70, positioned above and at one side of the bunker chamber. Such blowers are driven by means of a suitable driving mechanism, such as the motor 71, which is connected to the blower drive shafts 72. The blowers are suitably housed on the bunker roof 27, as by means of the walls 73 and 74. As will be observed from an inspection of Figure 3, the top section or roof 27 of the bunker chamber is provided with a series of apertures 75 which establish communication between the bunker and the fan housing. In these circumstances, the blowers draw air through the bunker chamber and over the expansion coil and then discharge chilled air into the plenum chamber. Recirculating air is admitted to the bunker through the enlarged apertures 76 in the wall 26, which, it will be noted, is adjacent the point of inlet of the products to be treated.

The length of the expansion coil 30, or more strictly the cooling capacity of the refrigeration unit, is established to satisfy the cooling requirements of the particular use for which the unit is intended. Within the bunker chamber there is provided a condenser or drip pan 80.

It will be understood that the expansion coil 30 comprises an element in a typical direct expansion system, utilizing a volatile liquid such as ammonia. As shown, the storage tank or accumulator 90 is suitably connected, as through a line 91, to the condenser and compressor of a typical refrigeration cycle. The condenser, compressor and lines have been omitted so as to clarify the drawings. The construction and association of these elements each with the other is well known to those skilled in the art. The storage tank or accumulator 90 is connected through the line 92 and expansion or throttle valve 93, to the expansion coil 30. In the manner well known to those skilled in the art, the cool, liquified ammonia passing through valve 93 is reduced in pressure and volatilized. In its passage through the expansion coil, it abstracts heat from the surrounding medium. The vapor discharged from the expansion coil passes through the discharge line 94 and thence by way of branch 95 through a scale separator or other clarifying device to the suction side of the compressor. After passing through the compressor and condenser, in the well known manner, the liquified refrigerant is re-admitted through line 91 to be recycled. The operation of valve 93 may be controlled thermostatically to meet the requirements for any particular installation.

When the present system is employed for refrigeration purposes which require very low temperatures, it may be coupled up as an additional refrigeration cycle with a pre-existing refrigeration apparatus. Such a serial connection will readily be understood and can well be made by those skilled in the art.

The conveyor mechanism for transporting the articles to be frozen may be of any suitable or desired type, such, for example, as that more particularly described and shown in my earlier Patents No. 1,955,668 and No. 1,955,669.

With this type of structure, it will be seen that effective recirculation of air through the cooling unit is insured and that, in such recirculation, the air is caused to positively flow through a series of angular, elongated passageways, countercurrent to the incoming products which are to be frozen. In the drawings, air flow is indicated by the full-line arrows, and the path of the products to be frozen by the broken line arrows. It will thus be seen that relatively warm air is sucked in under the action of the blowers 70, through the apertures or louvers 76, into the bunker chamber. This air is then constrained, by reason of the baffles, to pass longitudinally in a sinuous passage over the bank of expansion coils. In this passage the refrigerant within the coils abstracts heat from the circulating air, reducing the temperature of the latter down to a low point. Such air, after this drastic cooling, is then forced under the action of the fans through the plenum chamber A, and is discharged (as shown in Figure 4) into the passageway B. It will be noted that the passageway B constitutes the latter portion of the path of travel of the products to be frozen. In these circumstances, therefore, just prior to discharge from the unit, the articles being frozen are contacted with positively circulated air at the minimum temperature. The air forced into passageway B then flows sequentially through passageways C, D and E, back into the bunker chamber. Contemporaneously, the materials to be frozen are admitted into the passageway E and are passed thence sequentially through passageways D, C and B in countercurrent direction to the airflow.

It is particularly to be observed that in the present operation the clean, fresh air is recycled to and from the bunker. In operation of the unit, therefore, after a predetermined number of such cycles or passages, the temperature of the air is reduced to a point where it is not materially in excess of the refrigerant passing through the coil 30. With such a diminution in the temperature differential, dehydration of the air is materially reduced with consequent reduction in weight loss, due to dehydration of the product to be processed.

As intimated hereinbefore, one preferred use of the unit described herein is for quick freezing fresh, full drawn poultry. In order to supply fully drawn poultry to the trade, in which poultry is preserved the natural flavor, it is necessary to refrigerate in a very short time after killing. It is a fact that fully drawn poultry tends to deteriorate more quickly than the so-called "New York dressed" poultry. This is probably due to the fact that a considerable area of the more readily decomposable flesh is exposed to the air. Whereas, in "New York dressed" poultry, the entire product is covered and protected by the original epidermis, in fully dressed poultry only a portion of the ultimate exposed area is covered and hence protected by the epidermis, the remainder being comprised of the vascular subcutaneous tissue, from which there is a greater tendency to loss of body moisture by evaporation and which tissue is also more susceptible to deterioration.

In the proper refrigeration of such products, therefore, the refrigeration process must carefully be controlled so as to insure a quick and effective removal of the residual body heat and subsequent sharp or drastic freezing without undue loss of weight and consequent impairment of texture and flavor. In the present improved method, the special type of air recirculation, in conjunction with the countercurrent flow of the products, insures a minimum weight loss of the product and furthermore provides for a preliminary time interval of, so to speak, low temperature refrigeration which insures the removal of body heat and without inordinate dehydration prior to the drastic freezing treatment. In other words, the present method provides, in a single thruput, for both precooling, or prechilling, and sharp freezing.

As more particularly illustrative of the functioning of the present unit and for the purpose of producing refrigerated freshly drawn poultry, the structure is so devised and operated that air is discharged from the bunker into passage B, at a temperature of the order of from —40° F., or above, to —60° F., or below. For this particular type of refrigeration, the total length of the conveyor system may be of the order of 30 feet or more. The speed of the conveyor is preferably adjusted so that the products pass through the refrigerating passageway at a speed of the order of 6 inches to 14 inches per minute. In these circumstances therefore, the complete refrigeration cycle is completed in from one-half to one hour, during which time the product is prechilled and then brought down to an ultimate temperature of the order of 40° below zero. With this type of process, it is possible to freeze two hundred one-pound broilers in from 30 to 60 minutes. It will be understood, of course, that the length of travel of the products, through the passageway, and the speed of the conveyor is adjusted with respect to the character and size of the products to be treated and the ultimate temperature to which they are to be reduced.

In operating the unit, as already indicated, the freshly drawn chickens which are accumulated in the room 4 are placed upon the conveyor by means of suitable detachable racks, baskets, and the like, as by feeding the poultry through the door 60. Such poultry then enters the freezing chamber section defined by the side walls 20 and 8 in which they are first contacted with the warmer air escaping into the chamber from passage B. This chamber is in effect a prechilled room in which relatively cool and quiescent air is maintained. It is particularly to be noted that this room is not directly included in the positive air circulation cycle and hence the air therein is relatively still or quiescent. During the passage of the poultry through this prechilled room the body heat is largely abstracted and dehydration minimized. As is explained in prior patent No. 1,955,669, the poultry are so disposed and spaced on the conveyor that there is no possibility of contact of the adjacent units, so that free circulation of air over the entire surface of each unit and, hence, uniform freezing is insured. In the early phase of travel, the body heat is abstracted and, as the products pass into the progressively cooler areas, the temperature is commensurately reduced such that when arriving at the discharge point (pulley 52) they are reduced to the desired ultimate temperature. At this point they are removed from the conveyor and may then be packaged or otherwise treated in the storage room 3. It is found that with this type of treatment, fresh, fully drawn poultry may be refrigerated or frozen down to the temperatures of the orders stated. With such an established low temperature, these products may be packaged in suitable containers, such as cardboard, or other units of reasonably good insulation value, and may be shipped to distant points without further refrigeration.

It will be appreciated that what has been said of the treatment of freshly drawn poultry applies generally to other products which are desired to be preserved under the present method, it being understood that it is only necessary to make the requisite adjustments as to speed of travel, conveyor length, and temperature of the air, so as to adapt the system to the products to be frozen.

In the type of apparatus thus far described, the refrigerating chamber, per se, comprises essentially two narrow, L-shaped passageways, which are associated with a substantially centrally positioned expansion coil or bunker chamber. It will be appreciated, however, that within the concept of the invention, other specifically different associations of passageways may be availed of. As an example of a unit in which an increased or prolonged travel is given, a structure of the type shown in Figure 5 may be employed. In this structure, the refrigerating unit per se, it will be understood, is positioned in the area R and the plenum chamber of such refrigeration unit extends over to the first passageway B'. The cooling area comprises the passageway B', which is in open communication with a narrow parallel passageway C', the latter in turn being connected to a similar parallel passageway D'. The passageway D' communicates with an angularly disposed passageway E', the latter being in open communication with a series of parallel passageways F', G', H', I' and J'. As in the unit previously described, the products to be frozen enter at 100 and then pass, in the direction indicated by the arrows, in counterflow relationship to the flow of air, the entering products being contacted first with the air at the higher temperatures and being contacted just prior to discharge from the apparatus (at 101) with air at the minimum temperature. Similarly, as shown in Figures 6 and 7, other modified forms of associated passageways may be utilized. Thus, as shown in Figure 6, the refrigerating area may be comprised of a narrow, elongated passageway B'', which communicates with the angularly disposed passageway C''. This latter in turn is connected serially with a series of parallel passageways, D'', E'', and F'', communicating with the passageway G'', which is substantially parallel with passageway B''. In this structure the refrigeration unit may be positioned at R and the structure is operated under the same principles, that is to say, products to be treated are admitted at 200 and are conveyed through the passageways in countercurrent relationship with cold air, such that the products are contacted with the coldest air just prior to discharge from the apparatus at the discharge point 201.

In another embodiment of the invention, as shown in Figure 7, the refrigerating unit may be centrally located with respect to the refrigerating passageways, as for example by being positioned in the area R. The refrigeration space may be comprised of a series of parallel communicating passageways P. These are so respectively associated and correlated with the described refrigeration unit that products entering at 300 are first contacted with the warmer air and, immediately prior to discharge at 301, are contacted with air at the minimum temperature. The refrigeration unit R, as will be understood, is so associated with the cooling passageways that the air is recycled through the unit, warm air being withdrawn from the last passageway P, circulated through the refrigerator R, and discharged into the first passageway adjacent the discharge point 301. These and other equivalent arrangements may be established, in each of which the refrigerating unit per se is mounted more or less centrally with respect to the passageways, and in which the coldest air from the refrigerating unit is passed countercurrent to the products to be treated.

It will now be appreciated that a fundamental concept upon which the invention is based is the idea of utilizing a bulk supply of air, continuously cooling this down by passing it in heat exchange relationship to the expansion coil and extenuating it into thin streams so as to utilize it to contact with and abstract heat from the line of products undergoing refrigeration. Considered in another aspect, the invention may be said to comprise the concept of establishing, in a refrigeration chamber of any given volumetric size, the maximum or optimum line of travel for the products while in heat exchange contacting relationship with the refrigerating medium, in the particular case, with air reduced to a very low temperature. By utilizing this concept of, as it were, breaking up the refrigerating chamber into a markedly elongated, narrow passageway, not only is a maximum length of travel assured but, because of the narrowness of the passageway, a much more effective control of the rate and the amount of heat abstraction is achieved. In this manner, therefore, it is possible to secure an optimum quantum and rate of heat extraction in a refrigerating chamber of relatively small area. In short, utilizing the concept of the present invention, a relatively small compact unit is thus made to serve the full functions of prior units of considerably greater size. The principle of this establishment of a bulk supply of the cooling medium but of utilizing it, for heat extraction purposes, in the form of extenuated stream, is characteristic of the method and sharply differentiates it from earlier systems of recirculation.

It will be understood that, while specific embodiments of the invention have been described, these have been given didactically for the purpose of explaining the underlying principles. As will be appreciated, the invention, particularly in respect of the apparatus employed, is susceptible of considerable refinement. Thus, if desired, the several passageways which together constitute the entire line of travel of the articles may be positioned at relatively more obtuse angles than those shown. While in the drawings, in the preferred embodiment, the passageway sections are shown at substantially right angles to each other, this is given as merely illustrative of the principle of establishing the maximum length of travel for a given volumetric capacity.

Again, if desired, in order to insure a more streamlined flow of the cooled air, the sharp corners at the intersections of the several passageways may be filleted so as to diminish turbulence in these areas and insure better control of the heat abstraction.

Similarly, while the apparatus which has been illustrated involves the passage of the products to be refrigerated in the one horizontal plane, it will be understood that units may be devised in which such passage includes a series of vertical planes or a combination of vertical and horizontal planes.

Again, depending upon the exigencies of a particular installation, and/or the market demands as to quality of the particular product, the apparatus may be considerably refined. Thus, if desired, the several passageways may be illuminated by the lights 96 which may appropriately be positioned, as at the corners of the passageways, so as to provide adequate lighting for constant inspection.

Yet again, if desired, ultra-violet lamps, or equivalent units, indicated diagrammatically at 97, may be employed so as to irradiate the products passing through the refrigerating unit to enhance the dietetic value of, and/or sterilize the products undergoing treatment. If desired, also, ozonizers may be utilized in the structure.

Wherever the circumstances so require, the recirculating stream of refrigerated air may be caused to pass through air filters or other clarifying devices to purify or deodorize it. Similarly, if desired in a particular case, the food products may be concomitantly seasoned and refrigerated by introducing a flavoring principle, preferably in the vapor phase, in controlled amounts into the refrigerated air system adjacent the point of entry of the products.

Yet again, the apparatus, as will be appreciated by those skilled in the art, may considerably be refined as to its mechanical operation. Thus, the apparatus may be provided, adjacent the feed and discharge doors 60 and 61, with automatic feeding and discharge mechanisms respectively, so as to minimize handling of the products and generally increase the efficiency of the unit. For example, the chickens may be tied, across the wings or legs, with a string or cord provided with a loop whereby each chicken, or other unit, is suspended from hooks on the conveyor and in the spaced relationship mentioned. Adjacent the discharge door, a knife or trip mechanism which is associated with the conveyor drive may be utilized to automatically sever the suspension cord or remove the chicken from the hook, so that the frozen products may be delivered by gravity to a chute to be transported to the packaging room. These and other equivalent refinements may be utilized in the novel system and apparatus.

Thus, while preferred embodiments of the invention have been described and indicated, it will be understood that the invention itself is conceived to reside in the broad concept expressed, and is not intended to be limited to the structure shown, except as such limitations are clearly imposed by the appended claims.

I claim:

1. A refrigerating apparatus comprising a refrigeration unit, a refrigeration chamber; means to divide the chamber into a series of narrow, elongated passageways, a conveyor system extending through the passageways and adapted to transport products to be refrigerated therethrough; means to force air in a cyclic stream in heat exchange relationship with the refrigeration unit and thence through the said passageways and in a counter-current direction to the movement of the conveyor throughout the passageways.

2. A refrigeration apparatus for sharp freezing food products comprising a large insulated chamber, a series of partitions positioned in the chamber and cooperatively adapted to divide the chamber into a communicating series of relatively long, narrow passageways; an antechamber, a refrigeration apparatus having a portion thereof located in the antechamber, and having its expansion coil in the said enlarged insulated chamber, and means cooperating with said partitions to continuously recycle air in heat exchange relationship to the expansion coil and thence through the series of passageways in a predetermined direction and at a predetermined velocity; means to convey a line of articles to be refrigerated through the said series of passageways and in a direction counter to the flow of air throughout their travel.

3. An apparatus for sharp freezing food products which comprises, an enlarged insulated chamber, in which articles may be refrigerated, a refrigeration unit having a portion mounted adjacent the chamber and having an expansion coil thereof positioned within the chamber; means to divide the remainder of the said chamber into a series of long, narrow passageways so designed as to provide an optimum length of travel for a given volumetric size of the chamber; conveyor means mounted within the passageways; means cooperating with the first mentioned means to positively recirculate air in a predetermined uni-directional flow and at a predetermined velocity through the passageways and in heat exchange relationship with the said expansion coil; to said conveyor means serving to transport products to be refrigerated through the passageways in a direction counter to the flow of air throughout their travel.

4. An apparatus for sharp freezing food products which comprises, an enlarged chamber in which articles may be refrigerated, an antechamber adjacent the insulated chamber, a refrigeration unit having a portion mounted in the antechamber and having an expansion coil thereof positioned within the insulated chamber; means to divide the remainder of said insulated chamber into a series of long, narrow passageways so designed as to provide an optimum length of travel for a given volumetric size of the chamber; conveyor means mounted within and movable through the passageways and the antechamber, means cooperating with the first mentioned means to positively recirculate air in a predetermined uni-directional flow and at a predetermined velocity through the passageways and in heat exchange relationship with the said expansion coil; said conveyor means serving to transport products to be refrigerated to the passageways in a direction counter to the flow of air throughout their travel.

OTTO C. BOTZ.